(12) United States Patent
Chokkanathapuram Sundaram et al.

(10) Patent No.: US 11,843,472 B2
(45) Date of Patent: Dec. 12, 2023

(54) RE-CONVERGENCE OF PROTOCOL INDEPENDENT MULTICAST ASSERT STATES

(71) Applicant: Cisco Technology, Inc., San Jose, CA (US)

(72) Inventors: Ramakrishnan Chokkanathapuram Sundaram, Fremont, CA (US); Kesavan Thiruvenkatasamy, San Jose, CA (US); Rishabh Parekh, San Jose, CA (US); Raunak Banthia, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/844,589

(22) Filed: Jun. 20, 2022

(65) Prior Publication Data
US 2022/0321367 A1 Oct. 6, 2022

Related U.S. Application Data

(63) Continuation of application No. 16/778,669, filed on Jan. 31, 2020, now Pat. No. 11,368,324.

(51) Int. Cl.
*H04L 12/18* (2006.01)
*H04L 45/02* (2022.01)
*H04L 49/201* (2022.01)

(52) U.S. Cl.
CPC ............ *H04L 12/185* (2013.01); *H04L 45/02* (2013.01); *H04L 49/201* (2013.01)

(58) Field of Classification Search
CPC ..... H04L 12/185; H04L 45/02; H04L 49/201; H04L 45/16
See application file for complete search history.

(56) References Cited

U.S. PATENT DOCUMENTS 3,406,125 A1 3/2013 Dholakia et al.
9,356,789 B1 5/2016 Peter et al.
(Continued)

FOREIGN PATENT DOCUMENTS

CA 1052803 A2 11/2000

OTHER PUBLICATIONS

Fenner et al., "Protocol Independent Multicast—Sparse Mode (PIM-SM): Protocol Specification (Revised); draft-ietf-pim-rfc4601bis-03", Internet Engineering Task Force, IETF; Standardworkingdraft, Internet Society (ISOC), May 7, 2014, Section 3.6-4.3.1, and 4.6, pp. 1-133.
(Continued)

*Primary Examiner* — Chandrahas B Patel
(74) *Attorney, Agent, or Firm* — Lee & Hayes P.C.

(57) ABSTRACT

This disclosure describes techniques for improving convergence of Protocol Independent Multicast assert state information in multicast groups. A method includes forwarding, by a router, a PIM join message originating from a destination host and stores distribution tree information based on the join message. The method further includes participating, by the router, in a Protocol Independent Multicast ("PIM") assert election among a plurality of routers and storing, by the router, PIM assert state information based on an outcome of the PIM assert election. The method further includes acquiring, by the router, routing information base ("RIB") convergence. The method further includes triggering by the router, or causing, by the router, another router to trigger, a PIM assert among the plurality of routers. The method further includes re-converging, by the router, with PIM assert states among the plurality of routers and storing, by the router, converged PIM assert state information.

16 Claims, 8 Drawing Sheets

(56) References Cited

U.S. PATENT DOCUMENTS

| | | |
|---|---|---|
| 10,057,121 B2 | 8/2018 | Jha et al. |
| 10,728,137 B1* | 7/2020 | Chakraborty ............ H04L 45/16 |
| 11,070,386 B2* | 7/2021 | Kebler ................. H04L 12/1886 |
| 11,108,622 B2* | 8/2021 | Nandy ................. H04L 41/0672 |
| 2017/0085424 A1 | 3/2017 | Jha et al. |
| 2020/0177438 A1 | 6/2020 | Nandy et al. |
| 2021/0243044 A1 | 8/2021 | Chokkanathapuram Sundaram et al. |

OTHER PUBLICATIONS

Office Action for U.S. Appl. No. 16/778,669, dated Oct. 29, 2021, Sundaram, "Re-Convergence of Protocol Independent Multicast Assert States", 12 pages.

Office Action for U.S. Appl. No. 16/778,669, dated Jun. 1, 2021, Sundaram, "Re-Convergence of Protocol Independent Multicast Assert States", 10 pages.

The PCT Search Report and Written Opinion dated May 17, 2021, for PCT Application No. PCT/US2021/015867, 16 pages.

* cited by examiner

```
0 1 2 3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Addr Family | Encoding Type | Rsrvd |A|S|W|R| Mask Len |
+-+-+-+-+-+-+-+-+-+-+-+-+-+-+-+-+-+-+-+-+-+-+-+-+-+-+-+-+-+-+-+-+
| Source Address
+-+-+-+-+-+-+-+-+-+-+-+-+-+-+-+-+-+-...
```

FIG. 5

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Addr Family   | Encoding Type | Rsrvd     |S|W|R|   Mask Len    |
+-+-+-+-+-+-+-+-+-+-+-+-+-+-+-+-+-+-+-+-+-+-+-+-+-+-+-+-+-+-+-+-+
|              Source Address (Encoded-Source format)            |
+-+-+-+-+-+-+-+-+-+-+-+-+-+-+-+-+-+-+-+-+-+-+-+-+-+-+-+-+-+-+-+-+
|F|S|  Type    | Length        |A|
+-+-+-+-+-+-+-+-+-+-+-+-+-+-+-+-+-+-+-+-+-+-+-+-+-+-+-+-+-+.....
```

FIG. 6

RE-CONVERGENCE OF PROTOCOL INDEPENDENT MULTICAST ASSERT STATES

RELATED APPLICATIONS

The present disclosure claims the benefit of and is a continuation of U.S. patent application Ser. No. 16/778,669 filed on Jan. 31, 2020, entitled "RE-CONVERGENCE OF PROTOCOL INDEPENDENT MULTICAST ASSERT STATES", which is hereby incorporated by reference in its entirety.

TECHNICAL FIELD

The present disclosure relates generally to improving convergence of Protocol Independent Multicast assert state information in multicast groups.

BACKGROUND

Multicast is a concept utilizing Internet Protocol ("IP")-based networking to address network traffic, in the form of IP packets, from a source host to multiple destination hosts. Multicast is conducted based on defining a group made up of source hosts and destination hosts. In multicast, routers on paths of one or more networks connecting each source host to each destination host are relied upon to forward multicast packets in accordance with a distribution tree connecting each source host to each destination host. By forwarding multicast packets according to the tree structure branching out from a source host, routers may cause multicast packets to be propagated to multiple destination hosts without that source host sending multiple packets over the network, alleviating network load and improving packet forwarding efficiency.

Hosts may establish their membership in a group (based on interest in receiving multicast traffic) by one of various multicast protocols, such as versions of Internet Group Management Protocol ("IGMP"). However, whereas protocols such as IGMP are implemented at local network domains encompassing a host and a local router, multicast traffic generally passes through other network domains over any number of other private networks, public networks, and the Internet. On routers in these domains, rather than implementing a specific multicast protocol, Protocol Independent Multicast ("PIM") is instead implemented. PIM, as a stand-alone protocol, provides operations which correspond to analogous operations defined in protocols such as IGMP. Routers implementing PIM and storing distribution tree data establish interoperability with specific multicast protocols such as IGMP in order to interconnect the operation of multicast across many local networks implementing different multicast protocols.

However, for routers to cooperate in performing multicast routing, each router in a PIM domain should locally store the multicast distribution tree information agreed upon among the routers, so as to achieve convergence of multicast state information. It is desired to re-establish convergence of such multicast distribution tree information as expeditiously as possible through operations that may disrupt local data storage.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates an example join message format according to example embodiments of the present disclosure.

FIG. 6 illustrates an example join message format having headers according to example embodiments of the present disclosure.

DESCRIPTION OF EXAMPLE EMBODIMENTS

Overview

Figure 1A:
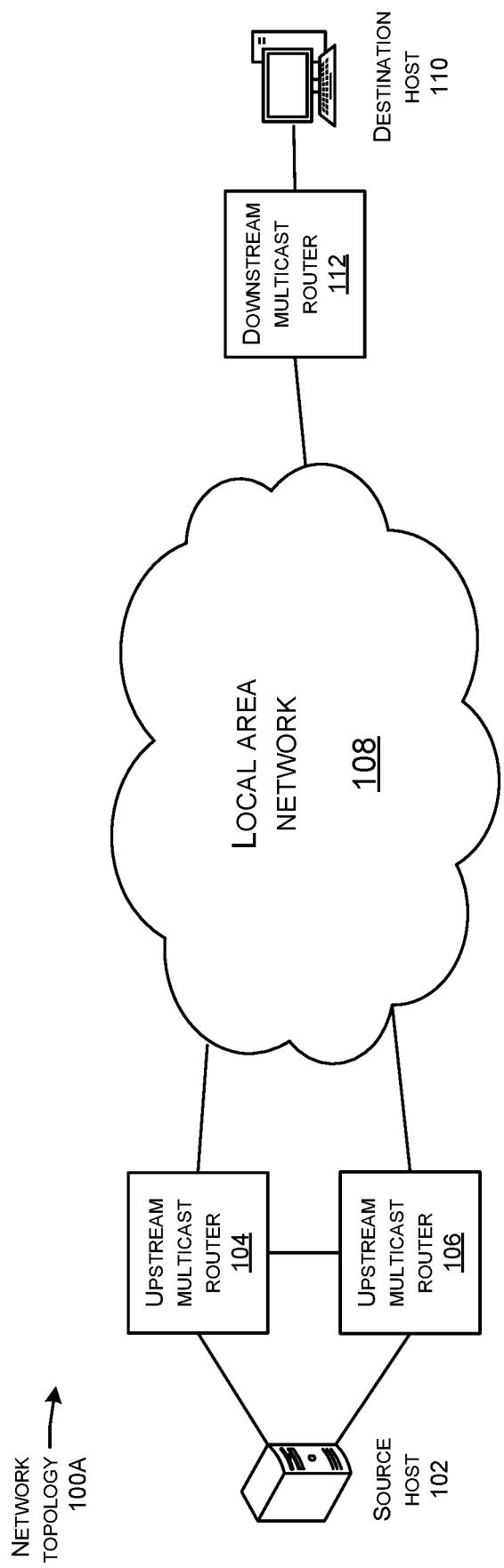
FIGS. 1A, 1B, and 1C illustrate diagrams of network topologies shown in part to illustrate example embodiments of the present disclosure.

This disclosure describes techniques for improving convergence of Protocol Independent Multicast assert state information in multicast groups upon convergence-loss events, as shall be subsequently defined in further detail in the present disclosure. A method includes forwarding, by a router, a PIM join message originating from a destination host and stores distribution tree information based on the join message. The method further includes participating, by the router, in a Protocol Independent Multicast ("PIM") assert election among a plurality of routers and storing, by the router, PIM assert state information based on an outcome of the PIM assert election. The method further includes acquiring, by the router, routing information base ("RIB") convergence subsequent to loss thereof as a consequence of a prior convergence-loss event. The method further includes triggering by the router, or causing, by the router, another router to trigger, a PIM assert among the plurality of routers. The method further includes re-converging, by the router, with PIM assert states among the plurality of routers and storing, by the router, converged PIM assert state information.

Additionally, another method includes forwarding, by a router, a PIM join message originating from a destination host and stores distribution tree information based on the join message. The method further includes participating, by the router, in a Protocol Independent Multicast ("PIM") assert election among a plurality of routers and storing, by the router, PIM assert state information based on an outcome of the PIM assert election. The method further includes acquiring, by the router, routing information base ("RIB") convergence subsequent to loss thereof as a consequence of a prior convergence-loss event. The method further includes sending, by the router, a hello message including a state request option to the plurality of routers. The method further includes re-converging, by the router, with PIM assert states among the plurality of routers and storing, by the router, converged PIM assert state information.

Additionally, the techniques described herein may be performed by a system and/or device having non-transitory computer-readable media storing computer-executable instructions that, when executed by one or more processors, performs the methods described above.

Example Embodiments

Protocol Independent Multicast ("PIM") is implemented over routers in a network domain (described herein as a "PIM domain" for ease of reference) to enable forwarding of multicast packets over one or more networks from any number of source hosts belonging to a multicast group to any number of destination hosts belonging to the multicast group. Relative positions of network nodes including a source host, a destination host, and any multicast router located in a PIM domain on a path between the source host and the destination host may be defined according to the direction of transport of the multicast packets as upstream (that is, located any number of network hops towards the source host) or downstream (that is, located any number of network hops towards the destination host). Multicast packets should be transported from upstream network nodes to downstream network nodes.

A destination host may send a request to a multicast group indicating the destination host's interest in receiving multicast traffic from a source host of the multicast group. The request may be sent in accordance with any specific multicast protocol, such as Internet Group Management Protocol ("IGMP"). Regardless of the specific multicast protocol, when the request is transported to a multicast router in a PIM domain, the request may be translated to a join message according to PIM. A join message according to PIM may indicate that a destination host reachable through a multicast router, that is, a destination host "behind" the multicast router, has interest in multicast traffic from a source host of a particular multicast group and therefore is requesting to join the multicast group.

According to various implementations of PIM, such as Dense Mode, Sparse Mode, and the like, a multicast router may build a distribution tree based on the join message. A distribution tree according to PIM may be notated (S, G), where G denotes a multicast group, and S denotes a particular source host of the multicast group. According to shortest path tree ("SPT") source trees as implemented by PIM, a multicast group may include multiple SPTs (S, G), where G is constant but each S is a different source host, and different destination hosts may receive multicast traffic each from a different source host by a different SPT. Alternatively, a distribution tree according to PIM may be notated (*, G), where G denotes a multicast group, but multiple source hosts may each direct multicast traffic to a common root of one SPT shared tree, and all destination hosts receive multicast traffic from this common root over the same shared tree.

Regardless of whether a distribution tree built is a source tree or a shared tree, multicast routers located in a PIM domain may build a distribution tree by applying reverse path forwarding ("RPF") to routing tables stored at the multicast routers for unicast routing purposes so as to forward the join message to an upstream router determined to be part of a SPT leading to a source host. Multicast routers along paths of a distribution tree being built may store distribution tree routing information which establishes that multicast traffic received over a particular router interface should be forwarded over one or more router interfaces. Since join messages are forwarded in a downstream-upstream direction, in the direction of source hosts, distribution tree routing information may be stored first at multicast routers located nearest leafs of the distribution tree, and subsequently at multicast routers located nearer a root of the distribution tree.

For example, the multicast router may determine, by comparing a source host specified by a join message and a router interface on which the join message was received with unicast routing tables, whether the multicast router is on a shortest path from the specified source host to the destination host (that is, by unicast routing algorithms as known in the art, the router has already determined that it is on a shortest path for forwarding unicast packets from the source host to the destination host, and stored that path information locally in unicast routing tables). In the event that the source host and the router interface match an entry in the unicast routing tables, the multicast router may forward the join message upstream to an upstream network node thus identified as part of the shortest path.

In the event that a multicast router has an interface connected to a network segment shared by multiple upstream multicast routers in a PIM domain, it is possible that the multiple upstream multicast routers may forward duplicative multicast traffic from a same source host, over the shared network segment, leading to redundant multicast traffic and unnecessary congestion over the shared network segment. Therefore, implementations of PIM further implement PIM assert protocols to enable upstream multicast routers sharing a network segment to reach a mutual consensus regarding which upstream multicast will forward multicast traffic from a same source host over the shared network segment.

According to PIM assert protocols, the construction of distribution trees may result in a same downstream multicast router constructing both a source tree by forwarding a (S, G) join message and a shared tree by forwarding a (*, G) join message over a shared segment as described above, where the (S, G) join message and the (*, G) join message are sent to different upstream multicast routers. Consequently, once both the source tree and the shared tree have been constructed, packets of the same multicast traffic may be forwarded from a same source host over both of the different upstream multicast routers.

The upstream multicast router may detect that it has received two duplicative multicast packets over an outbound interface forwarding over the shared segment. Upon such detection, the upstream multicast router sends an assert message according to PIM to the downstream multicast routers and other multicast routers of the PIM domain. Based on various metrics, which may be any arbitrary network metrics as known to persons in the art such as administrative distance, unicast routing table information, and IP addresses, the routers forwarding over the shared segment mutually elect one of the upstream multicast routers as a PIM forwarder to the downstream multicast router over the shared segment, by sending PIM assert messages to trigger a PIM assert election among the routers forwarding over the shared segment. It is known in the art to combine various metrics as described above to ensure that exactly one of the upstream routers is elected the PIM forwarder; the mechanisms of election need not be reiterated herein for the purpose of understanding example embodiments of the present disclosure.

Subsequent to electing the PIM forwarder, the downstream multicast router and the upstream multicast routers store PIM assert state information, so that knowledge of the state information causes the upstream multicast router which was the PIM assert "loser" of the election to refrain from forwarding multicast traffic over the shared segment (while the upstream multicast router which was the PIM assert "winner" of the election will continue to forward multicast traffic over the shared segment as normal). Each of the routers thus reach a state of convergence in multicast forwarding. Knowledge of the PIM assert state information further causes the downstream multicast router to periodically send join messages to the PIM assert winner. Knowledge of the PIM assert state information further causes the PIM assert winner to periodically send assert messages over the shared segment to prevent the PIM assert loser from triggering a new PIM assert election.

In general, PIM assert may occur in network topologies wherein the upstream multicast routers and downstream multicast routers are within a same PIM domain, such as a same local area network ("LAN"). PIM assert may occur in network topologies wherein the upstream multicast routers and downstream multicast routers are within different PIM domains connected by one or more physical or virtual network domains. For example, the different PIM domains may be connected by a LAN, a wide area network ("WAN"), a multicast virtual private network ("mVPN"), and the like.

Figure 1B:
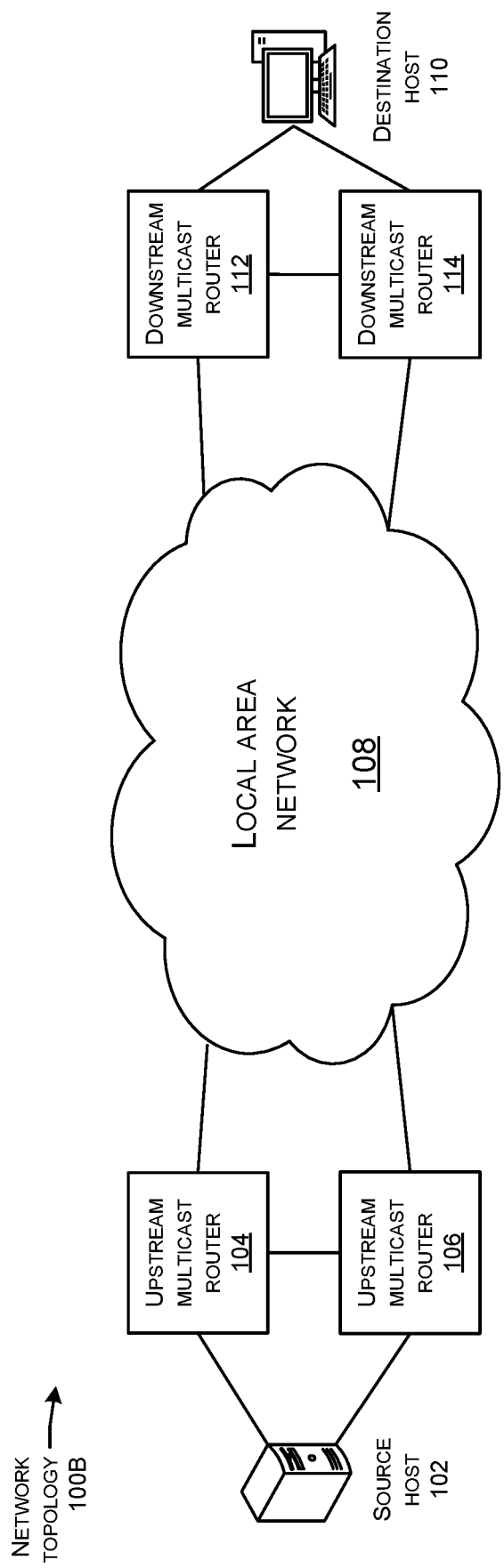
Figure 1C:
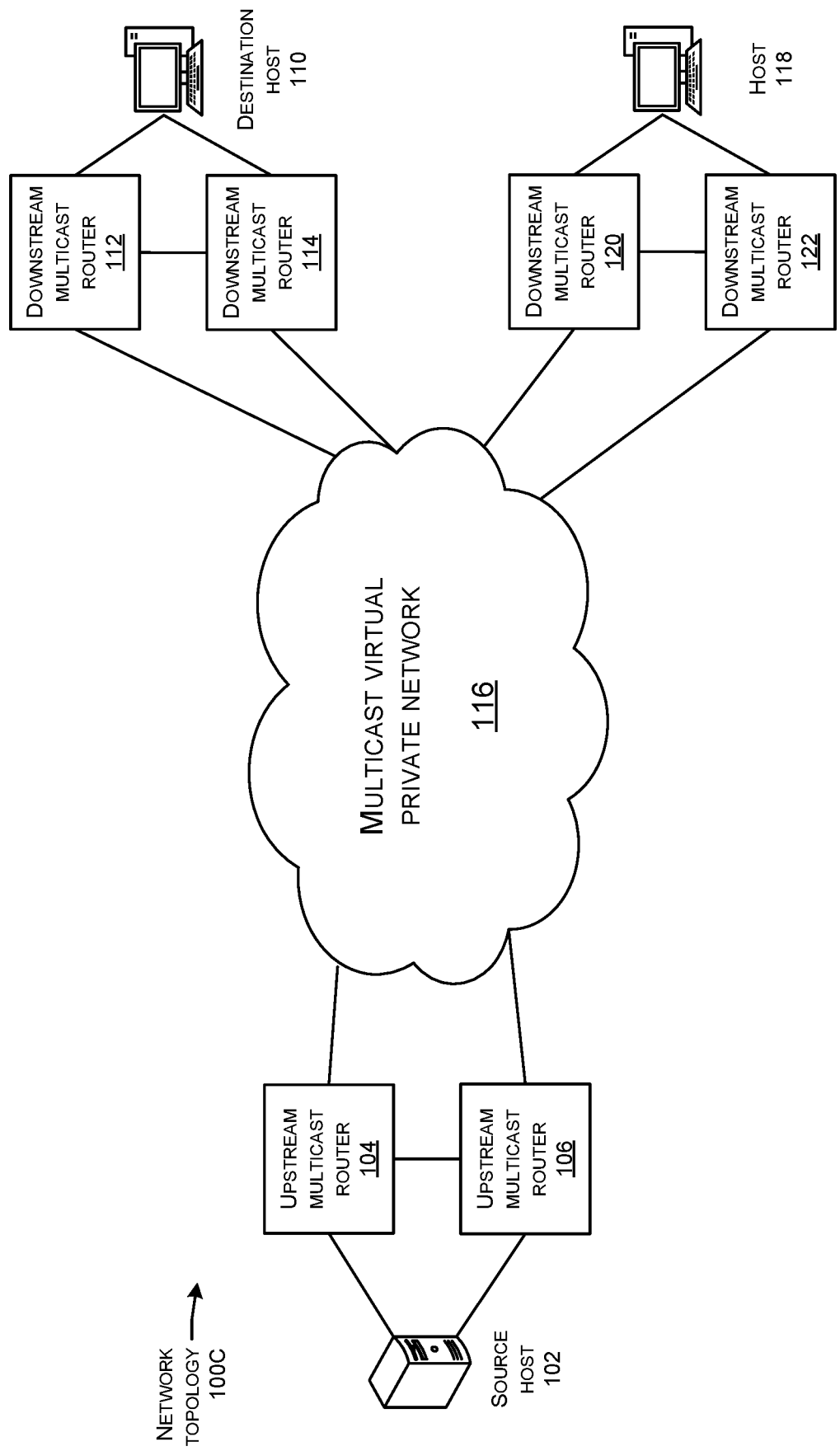

According to example embodiments of the present disclosure, example network topologies include at least a source host behind both of at least two upstream multicast routers in a PIM domain. FIGS. 1A, 1B, and 1C illustrate diagrams of network topologies shown in part to illustrate example embodiments of the present disclosure. For the purpose of the present disclosure, elements having common numbering across FIGS. 1A, 1B, and 1C may be referenced by the common numbering as though they were the same element, without regard to whether the topology of FIG. 1A, the topology of FIG. 1B, or the topology of FIG. 1C is being referenced. Moreover, it should be understood that parts of each network topology not relevant to understanding the present disclosure have been omitted from FIGS. 1A, 1B, and 1C or simplified in FIGS. 1A, 1B, and 1C, and that such omissions and simplifications do not impact understanding of example embodiments of the present disclosure.

According to a network topology 100A as partially illustrated in FIG. 1A, in a network domain which includes source host 102, the network domain is configured such that traffic to and traffic from the source host 102 may be forwarded over at least upstream multicast router 104 or upstream multicast router 106 in a PIM domain, which may be first hop routers from the source host 102 (notwithstanding any other routers which may be present in those domains). As a result of receiving join messages from downstream routers over the LAN 108, upstream multicast routers 104 and 106 may pull traffic from the source host 102, and forward the pulled traffic over LAN 108. They may further forward traffic, such as multicast traffic, from the source host 102 to multicast group members in other domains.

Furthermore, in a network domain which includes destination host 110 (which may be a different domain from the network domain which includes source host 102), the network domain is configured such that traffic to and traffic from the destination host 110 may be forwarded over at least downstream multicast router 112 in a PIM domain, which may be a first hop router from the destination host 110 (notwithstanding any other routers which may be present in those domains). Downstream multicast router 112 may forward traffic, such as a request in a specific multicast protocol which is translated to a join message according to PIM, from the destination host 110 to source hosts in other domains over the LAN 108, and may forward traffic, such as multicast traffic, from source hosts in other domains to the destination host 110. (As illustrated in the network topology 100B of FIG. 1B, downstream multicast router 114 may be another first hop router from the destination host 110, and may forward traffic similarly as downstream multicast router 112.)

As a consequence of the network topology 100A, join messages forwarded by the downstream multicast router 112 (and the downstream multicast router 114, as illustrated in the network topology 100B of FIG. 1B) may be forwarded either to the upstream multicast router 104 or the upstream multicast router 106, causing one or more distribution trees to be constructed over at least these routers. The upstream multicast router 104 and the upstream multicast router 106 may each receive the join messages and subsequently forward multicast packets based on the distribution trees constructed resulting from the join messages. One of the upstream multicast router 104 and the upstream multicast router 106 may forward, according to a source tree or a shared tree, multicast packets through the "lateral" segment (referring to a segment as illustrated connecting the two multicast routers 104 and 106, neither 104 or 106 being more or fewer hops downstream than the other from the source host 102) connecting the upstream multicast router 104 and the downstream multicast router 106, and the other of the upstream multicast router 104 and the upstream multicast router 106 may forward, according to a source tree or a shared tree, multicast packets over the lateral segment. Thus, duplicative multicast packets are forwarded over this lateral segment rather than over a shared segment leading upstream, and are forwarded to two different multicast routers; however, as both multicast routers will forward the multicast packets to the same destination host, the multicast packets are ultimately duplicative, and the upstream multicast router 104 or the multicast router 106 may ultimately trigger a PIM assert election upon receiving the duplicative multicast packets over their respective outgoing interfaces.

Alternatively, rather than including a lateral segment as described above, the network topology 100A instead may cause distribution trees to loop back to the upstream multicast routers 104 and 106. Such looping may also result in the upstream multicast routers 104 and 106 receiving multicast packets on a same interface over which the upstream multicast routers 104 and 106 sent multicast packets. In either case, the upstream multicast router 104, the upstream multicast router 106, and the downstream multicast router 112 (as well as, as illustrated in the network topology 100B of FIG. 1B, the downstream multicast router 114) may mutually elect a PIM assert winner among one of the upstream multicast router 104 and the upstream multicast router 106, and respectively store PIM assert state information in accordance; for the purpose of example embodiments of the present disclosure, it should merely be understood that one of these upstream multicast routers as described herein may trigger the PIM assert election.

According to a network topology 100C as partially illustrated in FIG. 1C, again, in a network domain which includes source host 102, the network domain is configured such that traffic to and traffic from the source host 102 may be forwarded over at least upstream multicast router 104 or upstream multicast router 106 in a PIM domain, which may be first hop routers from the source host 102 (notwithstanding any other routers which may be present in those domains). As a result of receiving join messages from downstream routers over the mVPN 116, upstream multicast routers 104 and 106 may pull traffic from the source host 102, and forward the pulled traffic over mVPN 116. They may further forward traffic, such as multicast traffic, from the source host 102 to multicast group members in other domains.

Furthermore, in a network domain which includes destination host 110 (which may be a different domain from the network domain which includes source host 102), the network domain is configured such that traffic to and traffic from the destination host 110 may be forwarded over at least downstream multicast router 112 or downstream multicast router 114 in a PIM domain, which may be first hop routers from the destination host 110 (notwithstanding any other routers which may be present in those domains). Downstream multicast routers 112 and 114 may forward traffic, such as a request in a specific multicast protocol which is translated to a join message according to PIM, from the destination host 110 to source hosts in other domains over the mVPN 116, and may forward traffic, such as multicast traffic, from source hosts in other domains to the destination host 110.

The mVPN 116 functions similarly in the network topology 100C as the LAN 108 functions in the network topologies 100A and 100B, interconnecting network traffic amongst the domain including the source host 102 and the domain including the destination host 110. It is known in the art that mVPN implementations may enable other hosts such as host 118 illustrated in FIG. 1C to join multicast groups, and enable other multicast routers such as downstream multicast router 120 and downstream multicast router 122 illustrated in FIG. 1C to forward join messages and multicast traffic; the illustration of these other hosts and routers merely serves to illustrate the multi-homed nature of mVPN-based network topology. Though the presence of other hosts and other routers may cause distribution trees to be constructed differently and may cause more routers to participate in forwarding and PIM assert elections, steps described according to example embodiments of the present disclosure are not fundamentally altered by these other hosts and other routers.

As a consequence of the network topology 100C, join messages forwarded by the downstream multicast router 112 and the downstream multicast router 114 may, in both cases, be forwarded either to the upstream multicast router 104 or the upstream multicast router 106, causing one or more distribution trees to be established over at least these routers. Similar to the procedure described above with regard to the network topologies illustrated in FIGS. 1A and 1B, the upstream multicast router 104 or the upstream multicast router 106 may trigger a PIM assert election as a result of receiving duplicative packets such as looped multicast traffic; or any other mechanism as known to persons skilled in the art may trigger a PIM assert election, in general, selecting a winner among the upstream multicast router 104 and the upstream multicast router 106. Subsequently, each of these routers may store PIM assert state information as described above.

Generally, multicast routing information stored at routers may be lost upon events such as router shutdown or restart for the purpose of software upgrades, or failures. Thus, router downtime may compromise convergence of distribution tree information and PIM assert state information. Moreover, even when these types of router downtime are mitigated by high-availability features in network operating systems, such as In-Service Software Upgrade ("ISSU") and Stateful Switchover ("SSO") implemented by CISCO IOS, IOS-XR, and NX-OS network operating systems from CISCO SYSTEMS INC. of San Jose, California, as well as other suitable network operating systems, loss of PIM assert state information may not be mitigated even though routers may remain available and may merely experience switchover rather than downtime. While existing high-availability features such as SSO may support re-establishing convergence for other state information of routers, they may not support re-establishing convergence for multicast state information.

Moreover, router downtime or switchover may cause a Generation ID ("GenID") of the router to become modified to indicate (according to PIM) that router uptime or process uptime has been interrupted. Consequences of such interruption may include, for example, the router failing to normally forwarding multicast traffic as part of a distribution tree. In the event that a PIM assert winner (such as upstream multicast router 104 or upstream multicast router 106 as illustrated in FIGS. 1A, 1B, and 1C) updates its GenID, any downstream PIM assert loser (such as downstream multicast router 112 as illustrated in FIGS. 1A, 1B, and 1C, downstream multicast router 114 as illustrated in FIGS. 1B and 1C, and downstream multicast router 120 and downstream multicast router 122 as illustrated in FIG. 1C) may determine that its own PIM assert state information is invalidated, and thus may send new join messages which, by operation of PIM, may establish new distribution trees and invalidate outcomes of a previous PIM assert election.

Alternatively, in the event that any downstream PIM assert loser (such as one of downstream multicast router 112 as illustrated in FIGS. 1A, 1B, and 1C and downstream multicast router 114 as illustrated in FIGS. 1B and 1C, and downstream multicast router 120 and downstream multicast router 122 as illustrated in FIG. 1C) updates its GenID, loss of convergence at the downstream PIM assert loser (such as distribution tree information and PIM assert state information, as well as loss of convergence in non-multicast routing information such as loss of RIB convergence as described below) may cause the particular downstream PIM assert loser to be unable to process PIM assert messages that are sent by a PIM assert winner (such as the other of the upstream multicast router 104 or upstream multicast router 106 as illustrated in FIGS. 1A, 1B, and 1C) according to the previous PIM assert state information, and the particular downstream PIM assert loser may still ultimately send new join messages, establish new distribution trees, and invalidate outcomes of the previous PIM assert election. In either case, while the routers may eventually re-converge under new distribution trees and a new PIM assert election by operation of PIM and PIM assert protocols, loss of convergence in the meantime generally leads to inefficient multicast forwarding, duplicative multicast packets, and such problems as previously described herein.

Thus, example embodiments of the present disclosure may enable re-convergence of PIM assert information among routers of PIM domains, so as to avoid lengthy periods of convergence loss and invalidation of PIM assert state information, and avoid the increasing chances of unnecessarily triggering PIM assert elections that may result as periods of convergence loss lengthen.

Figure 2:
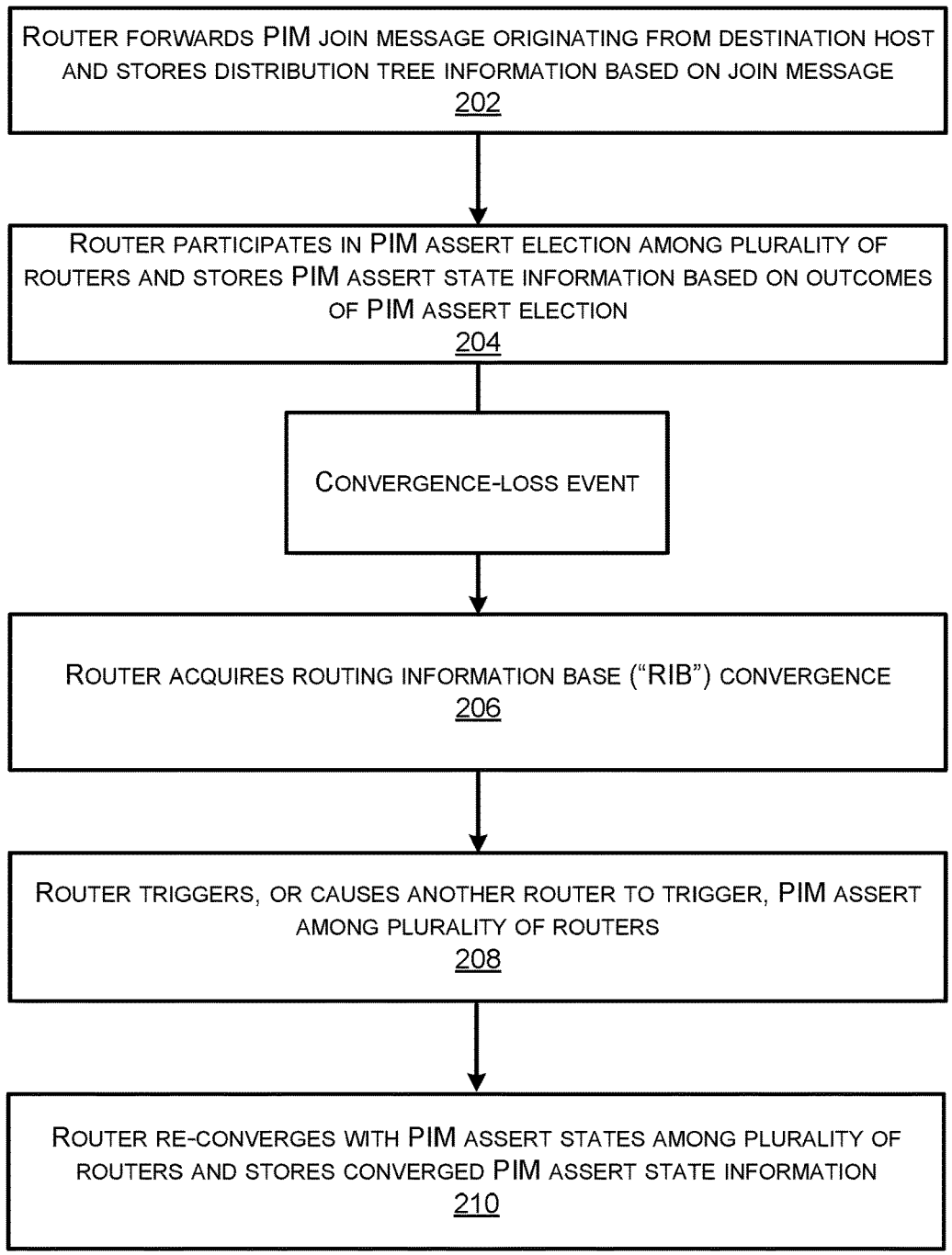
FIG. 2 illustrates a Protocol Independent Multicast ("PIM") assert state re-convergence process according to example embodiments of the present disclosure.

FIG. 2 illustrates a PIM assert state re-convergence process 200 according to example embodiments of the present disclosure. The PIM assert state re-convergence process 200 may be performed by a router in a PIM domain as described herein.

At step 202, a router forwards a PIM join message originating from a destination host and stores distribution tree information based on the join message.

As described above, the router may be a downstream multicast router or an upstream multicast router; the join message may be a (S, G) or a (*, G) join message; and the distribution tree may be, for example, a source tree or a shared tree.

At step 204, the router participates in a PIM assert election among a plurality of routers and stores PIM assert state information based on outcomes of the PIM assert election.

As described above, outcomes of the PIM assert election include a PIM assert winner being elected among the plurality of routers, with the remaining routers of the plurality of routers being PIM assert losers. PIM assert state information describing the outcomes may be stored on each of the plurality of routers, and may remain valid and converged while another PIM assert is not triggered, or is only triggered by the PIM assert winner. Mechanisms such as periodic messages and GenIDs as described above may prevent another PIM assert election from being triggered while all routers retain their respective distribution tree information and PIM assert state information.

While in general the router in question may be the PIM assert winner or a PIM assert loser, for the purpose of discussing the PIM assert state re-convergence process 200, the router may be assumed to be the PIM assert winner.

At step 206, the router acquires routing information base ("RIB") convergence.

Between steps 204 and 206, a convergence-loss event occurs at the router. While a convergence-loss event is not a step of the process 200 according to example embodiments of the present disclosure, it may be an extrinsic event which is a precondition to steps 206 and later being performed. Convergence-loss events refer to, generally, various events may cause the router to lose unicast routing information stored locally, including, for example, RIB tables, which were previously in a converged state with other routers in a same domain. It is known in the art that such loss of routing information may stem from events such as process shutdown or restart, or router shutdown or restart for the purpose of software upgrades (such as ISSU and SSO as described above), or failures. Subsequent to such loss of routing information, the router performs various processes known to persons skilled in the art to re-acquire RIB convergence with unicast routing information of other routers. Such processes include, for example, SSO as described herein. Acquiring RIB convergence may indicate that at least unicast routing information of the router has re-converged with other routers of a same domain.

However, generally events that cause loss of RIB convergence also cause loss of multicast convergence, and processes which restore RIB convergence do not also restore multicast convergence.

At step 208, the router triggers, or causes another router to trigger, a PIM assert among the plurality of routers.

Step 208 may be performed before or after the router has acquired RIB convergence, and may begin before the router acquired RIB convergence, but may be completed after the router has acquired RIB convergence. For example, in the case that the router itself triggers the PIM assert, the router cannot trigger the PIM assert after the router has acquired RIB convergence. Step 208 is performed while the router is identified as a PIM assert winner in PIM assert state information stored by the plurality of routers.

According to example embodiments of the present disclosure, a GenID of the router may change or may remain the same following the router acquiring RIB convergence, depending on varying implementations of SSO. In the case that the GenID of the router changes, the router may cause another router to trigger the PIM assert by forwarding any PIM message among the plurality of routers. This only occurs because the router was the PIM assert winner, and cannot occur if the router had been a PIM assert loser; since the other routers store PIM assert state information identifying the router as the PIM assert winner, disagreement between the GenID forwarded in the PIM messages from the PIM assert winner and the GenID of the PIM assert winner stored in PIM assert state information by the other routers may invalidate the stored PIM assert state information (due to the PIM assert winner having lost convergence) and cause any of the other routers to send a join message; accordingly, any of the routers may ultimately trigger a PIM assert election as described above.

Alternately, in the case that the GenID of the router remains the same, the router cannot trigger, or cause another router to trigger, the PIM assert merely by forwarding any PIM message. Instead, the router may send a hello message containing an assert state request option, as described in further detail below, to the other routers.

According to PIM, a hello message is periodically sent by all multicast routers in a PIM domain to advertise information regarding the existence of multicast routers in the PIM domain. Conventionally, hello messages may be strings of characters, wherein certain characters or sequences of characters, having a fixed length in bits and occupying certain characters of a hello message according to PIM, designate options which convey information from one router to another without not necessarily soliciting a response therefrom. Hello message options according to PIM may include, for example, a GenID of a router, a list of routers neighboring the router, and IDs of interfaces of the router.

According to example embodiments of the present disclosure, hello message formats according to PIM may be modified by defining an assert state request option therein. The assert state request option may be defined as having a binary state which indicates either that a router sending a hello message is or is not interested in learning PIM assert state information from the other routers in the PIM domain. Thus, the assert state request option may be defined in the hello message format having a character length sufficient to express a binary state, such as 1 bit.

In the event that the router sends a hello message containing an assert state request option, other routers in the PIM domain may receive the hello message containing the assert state request option. According to example embodiments of the present disclosure, each of the other routers may be configured to determine that the router is a PIM assert election winner based on stored PIM assert state information, and then respond to the hello message containing the assert state request option by sending a join message containing a PIM assert re-trigger option, as described in further detail below, to the router. (The outcome of this same act of sending a hello message containing an assert state request option differs if the router is a PIM assert loser, and is described below with reference to FIG. 3.)

According to example embodiments of the present disclosure, join message formats according to PIM may be modified by defining a PIM assert re-trigger option therein. The PIM assert re-trigger option may be defined as having a binary state which indicates either that a destination router of the join message has been determined to be a PIM assert election winner based on stored PIM assert state information (and that it thereby should trigger the PIM assert), or not. Thus, the PIM assert re-trigger option may be defined in the join message format having a character length sufficient to express a binary state, such as 1 bit.

An example join message format as described above is illustrated in FIG. 5, where the character "A" denotes the PIM assert re-trigger option.

Alternately, according to other example embodiments of the present disclosure, Join messages may further have headers defined by a header format, such as a Type-Length-Value ("TLV") format, according to various implementations of PIM. TLV may generally refer to any encoding format which encodes a value for a particular type of field, where the type of the field is encoded in a type field, the length of the value is encoded in a length field, and the value is encoded in a value field. Again, the PIM assert re-trigger option may be defined as having a binary state which indicates either that a destination router of the join message has been determined to be a PIM assert election winner based on stored PIM assert state information (and that it thereby should trigger the PIM assert), or not. Thus, the PIM assert re-trigger option may be defined in the TLV header format having a character length sufficient to express a binary state, such as 1 bit.

An example join TLV format as described above is illustrated in FIG. 6, where the character "A" denotes the PIM assert re-trigger option.

At step 210, the router re-converges with PIM assert states among the plurality of routers and stores converged PIM assert state information.

As described above, the PIM assert may be triggered by different routers by different mechanisms. In the event that the router itself triggers the PIM assert in response to receiving a join message containing a PIM assert re-trigger option, the router sends a PIM assert message to the other routers. As described above, while PIM assert state information is converged, the PIM assert winner should periodically send assert messages to the PIM assert loser to prevent the PIM assert loser from triggering a new PIM assert election. Thus, the router sending a PIM assert message to the other routers re-asserts the router's role as a PIM assert winner, as acknowledged by other routers by the join message having a PIM assert re-trigger option or field. The routers may re-converge based on an outcome of the previous PIM assertion election, validating the stored PIM assert state information at the other routers.

In the event that the router causes another router to trigger the PIM assert, the other router may trigger a second PIM assert election, which the router may participate in as described above with reference to step 204. Again, outcomes of the PIM assert election include a PIM assert winner being elected among the plurality of routers, with the remaining routers of the plurality of routers being PIM assert losers. PIM assert state information describing the outcomes may be stored on each of the plurality of routers, and may remain valid and converged while another PIM assert is not triggered, or is only triggered by the PIM assert winner. Mechanisms such as periodic messages and GenIDs as described above may prevent another PIM assert election from being triggered while all routers retain their respective distribution tree information and PIM assert state information.

Figure 3:
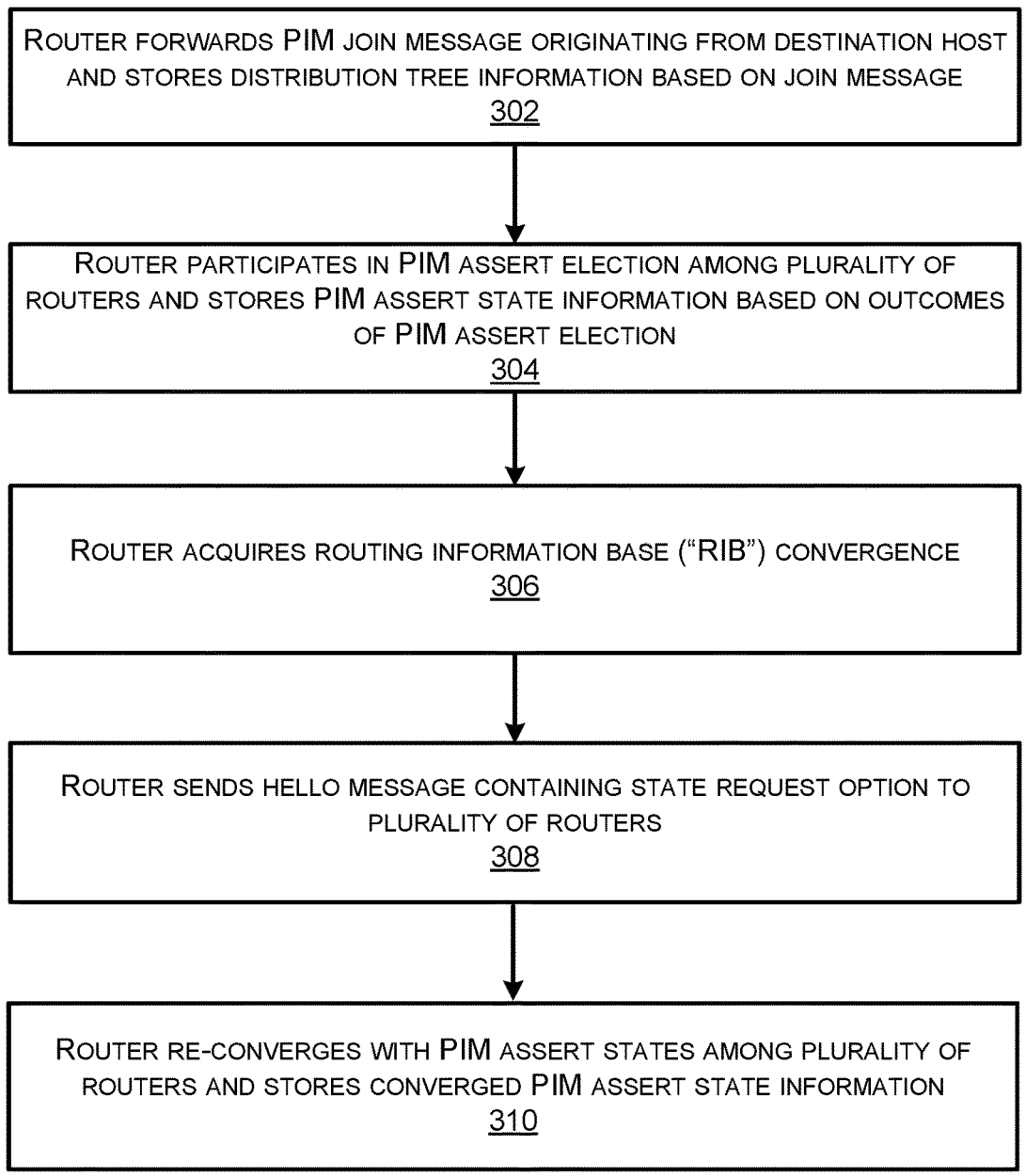
FIG. 3 illustrates a PIM assert state re-convergence process according to example embodiments of the present disclosure.

FIG. 3 illustrates a PIM assert state re-convergence process 300 according to example embodiments of the present disclosure. The PIM assert state re-convergence process 300 may be performed by a router in a PIM domain as described herein.

At step 302, a router forwards a PIM join message originating from a destination host and stores distribution tree information based on the join message.

At step 304, the router participates in a PIM assert election among a plurality of routers and stores PIM assert state information based on outcomes of the PIM assert election.

At step 306, the router acquires routing information base ("RIB") convergence.

Steps 302, 304, and 306 are similar to steps 202, 204, and 206 as described above with reference to process 200 (for example, RIB convergence may be reacquired following a SSO event), except that, for the purpose of discussing the PIM assert state re-convergence process 300, the router may be assumed to be any PIM assert loser.

At step 308, the router sends a hello message containing a state request option to the plurality of routers.

A hello message containing a state request option may be formatted as described above with reference to step 208. Step 308 may be performed after the router has acquired RIB convergence, rather than before the router acquired RIB convergence. Step 308 is performed while the router is identified as a PIM assert loser in PIM assert state information stored by the plurality of routers, which include the PIM assert winner.

Other routers in the PIM domain may receive the hello message containing the assert state request option. According to example embodiments of the present disclosure, the PIM assert winner may be configured to respond to the hello message containing the assert state request option by sending a PIM assert message to the router. (The outcome of this same act of sending a hello message containing an assert state request option differs if the router is instead the PIM assert winner, and is described above with reference to FIG. 2.)

At step 310, the router re-converges with PIM assert states among the plurality of routers and stores converged PIM assert state information.

As described above, while PIM assert state information is converged, the PIM assert winner should periodically send assert messages to the PIM assert loser to prevent the PIM assert loser from triggering a new PIM assert election. Thus, the PIM assert winner sending a PIM assert message to the routers re-asserts the outcome of the PIM assert election, enabling the router to store PIM assert state information based on the PIM assert message and re-converge. The router expeditiously re-converging based on an outcome of the previous PIM assertion election reduces the likelihood that the router may unilaterally trigger a PIM assert election due to prolonged loss of convergence.

It should be understood that a same router configured according to example embodiments of the present disclosure may perform both process 200 and process 300 as described above by the same logic; differences in steps performed and differences in outcome diverge solely depending on whether the router was a PIM assert winner or a PIM assert loser following steps 204 or 304, prior to loss of convergence.

Figure 4:
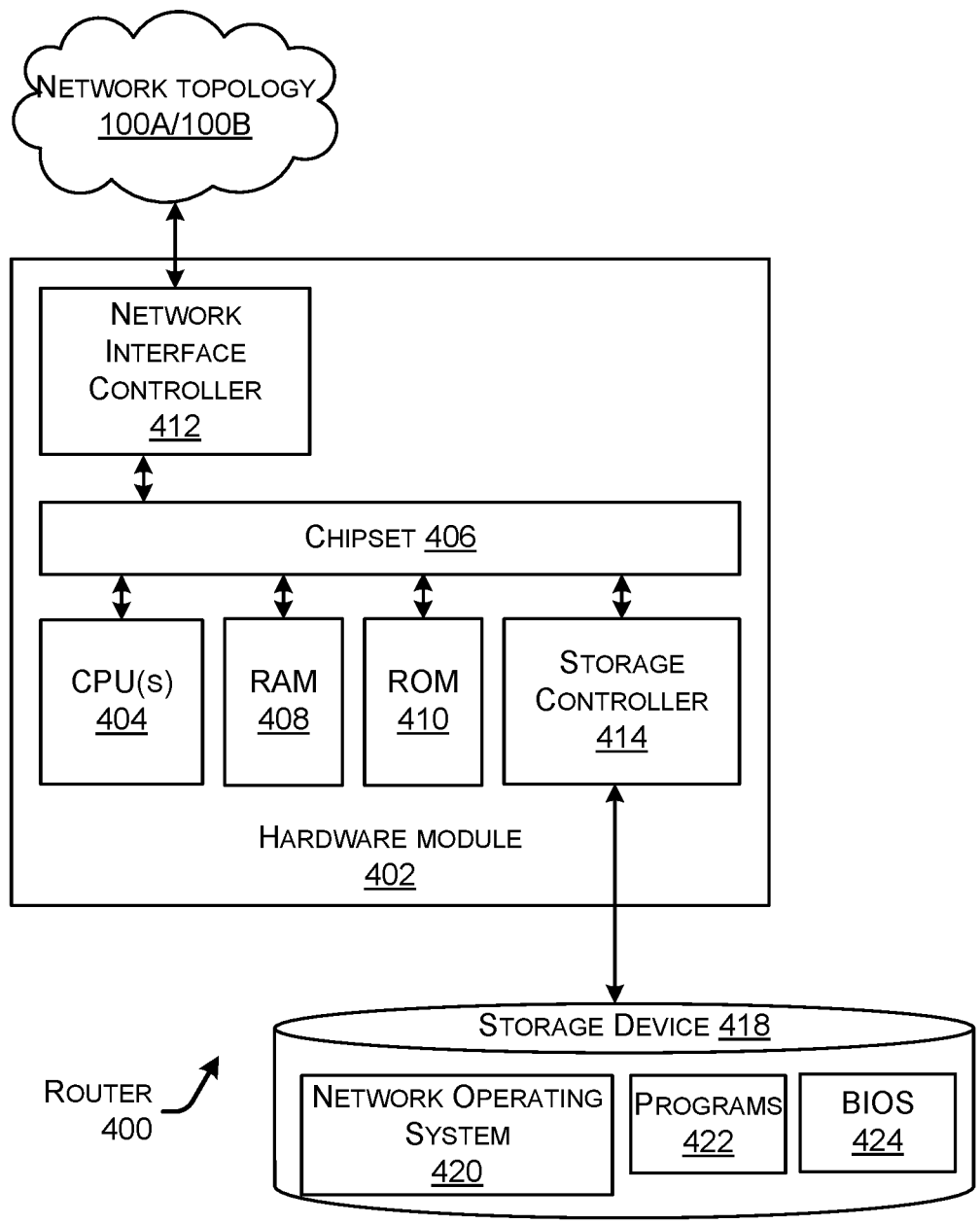
FIG. 4 shows an example computer architecture for a router capable of executing program components for implementing the functionality described above.

FIG. 4 shows an example computer architecture for a router 400 capable of executing program components for implementing the functionality described above. The computer architecture shown in FIG. 4 illustrates a computing device assembled from modular components, and can be utilized to execute any of the software components presented herein. The router 400 may, in some examples, be a multicast router as described above.

One or more hardware modules 402 installed in a router 400 may be a physical card or module to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the hardware module 402.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the hardware module 402. The chipset 406 can provide an interface to a RAM 408, used as the main memory in the hardware module 402. The chipset 406 can further provide an interface to a computer-readable storage medium such as a read-only memory ("ROM") 410 or non-volatile RAM ("NVRAM") for storing basic routines that help to startup the hardware module 402 and to transfer information between the various components and devices. The ROM 410 or NVRAM can also store other software components necessary for the operation of the hardware module 402 in accordance with the configurations described herein.

The hardware module 402 can operate in a networked environment using logical connections to remote computing devices and computer systems through a network, such as the network topologies 100A, 100B, or 100C as described above. The chipset 406 can include functionality for providing network connectivity through a NIC 412, such as a gigabit Ethernet adapter. The NIC 412 is capable of connecting the hardware module 402 to other computing devices over the network 408. It should be appreciated that multiple NICs 412 can be present in the hardware module 402, connecting the router 400 to other types of networks and remote computer systems.

The hardware module 402 can be connected to a storage device 418 that provides non-volatile storage for the hardware module 402. The storage device 418 can store an operating system 420, programs 422, a BIOS 424, and data, which have been described in greater detail herein. The storage device 418 can be connected to the hardware module 602 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The hardware module 402 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the hardware module 402 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The hardware module 402 can further read information from the storage device 418 by detecting the physical states or characteristics of one or more particular locations within the physical storage units.

In addition to the mass storage device 418 described above, the hardware module 402 can have access to other computer-readable storage media to store and retrieve information, such as program modules, data structures, or other data. It should be appreciated by those skilled in the art that computer-readable storage media is any available media that provides for the non-transitory storage of data and that can be accessed by the hardware module 402. In some examples, the operations performed by a router node of the network overlay, and or any components included therein, may be supported by one or more devices similar to the hardware module 402. Stated otherwise, some or all of the operations performed by a router node of the network overlay, and or any components included therein, may be performed by one or more hardware modules 400 operating in a networked, distributed arrangement over one or more logical fabric planes over one or more networks.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the hardware module 402. According to one embodiment, the operating system comprises the LINUX or NETBSD operating system and derivatives thereof. According to another embodiment, the operating system comprises the CISCO IOS, IOS-XR, or NX-OS network operating system from CISCO SYSTEMS INC. of San Jose, California, or any other suitable network operating system. It should be appreciated that other operating systems can also be utilized. The storage device 418 can store other system or application programs and data utilized by the hardware module 400.

In one embodiment, the storage device 418 or other computer-readable storage media is encoded with computer-executable instructions which, when loaded into a computer, transform the computer from a general-purpose computing system into a special-purpose computer capable of implementing the embodiments described herein. These computer-executable instructions transform the hardware module 402 by specifying how the CPUs 404 transition between states, as described above. According to one embodiment, the hardware module 402 has access to computer-readable storage media storing computer-executable instructions which, when executed by the hardware module 402, perform the various processes described above with regard to FIGS. 1-3 and FIGS. 5-6. The hardware module 402 can also include computer-readable storage media having instructions stored thereupon for performing any of the other computer-implemented operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A router comprising:
   one or more processors; and
   one or more non-transitory computer-readable media storing computer-executable instructions that, when executed by the one or more processors, cause the one or more processors to:
      participate in a Protocol Independent Multicast ("PIM") assert election among a plurality of routers and store PIM assert state information based on an outcome of the PIM assert election;
      acquire routing information base ("RIB") convergence;
      trigger, or cause another router to trigger, a PIM assert among the plurality of routers by sending a PIM hello message including an assert state request option to the plurality of routers;
      receive a join message including a PIM assert re-trigger option; and
      re-converge with PIM assert states among the plurality of routers by sending a PIM assert message to the plurality of routers, and store converged PIM assert state information;
      wherein a GenID of the router remains the same after the one or more processors acquire RIB convergence.

2. The router of claim 1, wherein the instructions further cause the one or more processors to store PIM assert state information based on the outcome of the router being elected as a PIM assert winner in the PIM assert election.

3. The router of claim 1, wherein the instructions cause the one or more processors to acquire RIB convergence following a convergence-loss event at the router, and the instructions cause the PIM assert to be triggered before or after RIB convergence is acquired.

4. The router of claim 1, wherein a Generation ID ("GenID") of the router changes after the one more processors acquire RIB convergence, and causing another router to trigger the PIM assert comprises forwarding a PIM message among the plurality of routers.

5. The router of claim 4, wherein the instructions further cause the one or more processors to participate in a second PIM assert election among the plurality of routers and store PIM assert state information based on an outcome of the second PIM assert election.

6. A method comprising:
   participating, by a router, in a Protocol Independent Multicast ("PIM") assert election among a plurality of routers and storing, by the router, PIM assert state information based on an outcome of the PIM assert election;
   acquiring, by the router, routing information base ("RIB") convergence;
   triggering by the router, or causing, by the router, another router to trigger, a PIM assert among the plurality of routers by sending a PIM hello message including an assert state request option to the plurality of routers;
   receiving, by the router, a join message including a PIM assert re-trigger option; and
   re-converging, by the router, with PIM assert states among the plurality of routers by sending a PIM assert message to the plurality of routers and storing, by the router, converged PIM assert state information;
   wherein a GenID of the router remains the same after acquiring, by the router, RIB convergence.

7. The method of claim 6, wherein a Generation ID ("GenID") of the router changes after acquiring, by the router, RIB convergence, and causing, by the router, another router to trigger the PIM assert comprises forwarding, by the router, a PIM message among the plurality of routers.

8. The method of claim 7, further comprising participating, by the router, in a second PIM assert election among the plurality of routers and storing, by the router, PIM assert state information based on an outcome of the second PIM assert election.

9. The method of claim 6, wherein PIM assert state information is stored based on the outcome of the router being elected as a PIM assert winner in the PIM assert election.

10. The method of claim 6, wherein RIB convergence is acquired following a convergence-loss event at the router, and the PIM assert is triggered before or after RIB convergence is acquired.

11. A router comprising:
    one or more processors; and
    one or more non-transitory computer-readable media storing computer-executable instructions that, when executed by the one or more processors, cause the one or more processors to:
       participate in a Protocol Independent Multicast ("PIM") assert election among a plurality of routers and store PIM assert state information based on an outcome of the PIM assert election;
       acquire routing information base ("RIB") convergence;
       send a hello message including an assert state request option to the plurality of routers; and
       re-converge with PIM assert states among the plurality of routers and store converged PIM assert state information.

12. The router of claim 11, wherein the instructions cause the one or more processors to acquire RIB convergence following a convergence-loss event at the router, and the instructions cause the hello message to be sent before or after RIB convergence is acquired.

13. The router of claim 11, wherein the one or more processors is configured to send the hello message including an assert state request option is performed after the router has acquired RIB convergence.

14. The router of claim 11, wherein re-converging with PIM assert states comprises receiving a PIM assert message from a PIM assert winner.

15. The router of claim 14, wherein re-converging with PIM assert states comprises storing PIM assert state information based on the PIM assert message.

16. The router of claim 11, wherein the instructions further cause the one or more processors to store PIM assert state information based on the outcome of the router being elected as a PIM assert loser in the PIM assert election.

* * * * *